US 6,554,140 B2

(12) United States Patent
Steger, Jr. et al.

(10) Patent No.: US 6,554,140 B2
(45) Date of Patent: Apr. 29, 2003

(54) SPIN-ON FILTER ASSEMBLY

(75) Inventors: Thomas H. Steger, Jr., Cookeville, TN (US); A. Caner Demirdogen, Cookeville, TN (US); Paul D. Miller, Cookeville, TN (US); Bruce Bounnakhom, Kalamazoo, MI (US); Samuel T. Masters, Cookeville, TN (US)

(73) Assignee: Fleetguard, Inc., Nashville, TN (US)

( * ) Notice: Subject to any disclaimer, the term of this patent is extended or adjusted under 35 U.S.C. 154(b) by 0 days.

(21) Appl. No.: 09/740,276

(22) Filed: Dec. 19, 2000

(65) Prior Publication Data

US 2002/0074281 A1 Jun. 20, 2002

(51) Int. Cl.$^7$ .............................................. B01D 27/08
(52) U.S. Cl. ........................ 210/438; 210/440; 210/443; 210/444; 210/450; 210/455; 210/DIG. 17
(58) Field of Search ................................. 210/438, 443, 210/444, 450, 453, 455, 456, DIG. 17, 440; 277/918

(56) References Cited

U.S. PATENT DOCUMENTS

| 1,033,858 A | 7/1912 | Adams |
| 1,647,799 A | 11/1927 | Hammer |
| 2,646,886 A | 7/1953 | LeClair ...................... 210/166 |
| 2,743,019 A | 4/1956 | Kovacs ........................ 210/184 |
| 3,000,506 A | 9/1961 | Hultgren ...................... 210/133 |
| 3,076,551 A | 2/1963 | Humbert, Jr. ................ 210/232 |
| 3,132,097 A | 5/1964 | Tietz ............................ 210/130 |
| 3,204,771 A | 9/1965 | Baldwin ...................... 210/443 |
| 3,231,089 A | 1/1966 | Thornton .................... 210/130 |
| 3,586,171 A | 6/1971 | Offer ........................... 210/136 |
| 3,719,281 A | 3/1973 | Dieringer .................... 210/210 |
| 3,859,216 A | 1/1975 | Sisson et al. ................ 210/440 |
| 4,052,307 A | 10/1977 | Humbert, Jr. ............... 210/130 |
| 4,369,113 A | * 1/1983 | Stifelman ................... 210/440 |
| 4,622,136 A | 11/1986 | Karcey ........................ 210/168 |
| 4,738,776 A | 4/1988 | Brown ......................... 210/168 |
| 4,740,299 A | 4/1988 | Popoff et al. ............... 210/232 |
| 4,832,844 A | 5/1989 | Ayers .......................... 210/440 |
| 4,839,037 A | 6/1989 | Bertelsen et al. ............. 210/97 |
| 4,841,628 A | 6/1989 | Nagle .......................... 210/232 |
| 4,855,047 A | 8/1989 | Firth ........................... 210/232 |
| 4,992,166 A | 2/1991 | Lowsky et al. ............. 210/130 |
| 5,082,561 A | 1/1992 | LaPierre ...................... 210/232 |
| 5,104,537 A | 4/1992 | Stifelman et al. ........... 210/440 |

(List continued on next page.)

FOREIGN PATENT DOCUMENTS

| FR | 1165203 | 10/1958 | |
| GB | 2 220 866 A | 1/1990 | |
| IT | 593874 | 5/1959 | |
| SE | 213194 | 3/1967 | |
| WO | WO 99/04879 | 2/1999 | ........... B01D/35/02 |

OTHER PUBLICATIONS

*The Donaldson P559000, The Best Choice for Keeping Cummins Engines on the Road Longer*, (Brochure No. F113014 {11/00}) The Donaldson Company, Copyright 2000.

*HMK03 Fluid Filter High Pressure*; Product Bulletin of Donaldson Company, Inc,.; Bulletin No. 1200–479 (Rev. Mar. 1992); copyright 1992; 4 pages (not numbered).

Primary Examiner—Matthew O. Savage
(74) Attorney, Agent, or Firm—Woodard, Emhardt, Naughton, Moriarty & McNett, LLP (57) ABSTRACT

A fluid filter has a filter element for filtering fluid. A nutplate having a threaded mounting portion is adapted to threadedly engage an externally threaded filter head. An inner seal retainer is positioned between the nutplate and the filtering element in order to define a hollow interior. The inner seal retainer has at least one stiff hollow web extending in a radial direction adapted to provide a space for transmitting fluid between the nutplate and the filter element. An inner radial seal is attached to the inner seal retainer for sealing the filter element with the filter head.

23 Claims, 4 Drawing Sheets

U.S. PATENT DOCUMENTS

| | | | |
|---|---|---|---|
| 5,118,417 A | 6/1992 | Deibel | 210/232 |
| 5,171,430 A | 12/1992 | Beach et al. | 210/94 |
| 5,256,285 A | 10/1993 | Tomita et al. | 210/234 |
| 5,300,223 A | 4/1994 | Wright | 210/232 |
| 5,342,511 A | 8/1994 | Brown et al. | 210/137 |
| 5,342,519 A | 8/1994 | Friedmann et al. | 210/232 |
| 5,490,930 A * | 2/1996 | Krull | 210/443 |
| 5,695,637 A | 12/1997 | Jiang et al. | 210/316 |
| 5,904,357 A | 5/1999 | Demirdogen et al. | 277/630 |
| 5,906,736 A | 5/1999 | Bounnakhom et al. | 210/232 |
| 5,906,740 A * | 5/1999 | Brown et al. | 210/450 |
| 5,996,810 A | 12/1999 | Bounnakhom et al. | 210/443 |
| 6,045,693 A | 4/2000 | Miller et al. | 210/248 |

* cited by examiner

SPIN-ON FILTER ASSEMBLY

BACKGROUND OF THE INVENTION

The present invention generally relates to fluid filters, and more specifically, but not exclusively, concerns a fluid filter with a compact design that minimizes fluid flow restrictions.

While the design of fluid filters over the years has involved literally hundreds of different concepts, the basic principles of operation have remained much the same. A fluid substance to be filtered must first be introduced into a filter housing or shell, and from there, the fluid is directed to flow into and through a filtering media. As the fluid exits from the filtering media, fluid is routed to a flow outlet. Throughout this flow loop, it is generally preferred that the unfiltered fluid not bypass the filtering media and that the fluid not leak from the filter shell. While these functions can normally be achieved by the use of properly designed and positioned seals, over time the seals deteriorate and leakage can occur. The passage of time and continuous use can also cause deterioration of other components and interfaces within the fluid filter.

For example, each pulse of fluid pressure creates a variable load on the nutplate of the fluid filter causing the nutplate to flex. The flexing of the nutplate creates wear on the plate and weakens the nutplate interfaces. In particular, this flexing causes the outer seal to deflect which can in turn create a leakage interface. To some extent, the rate of deterioration is affected by the operating environment and the nature of the substance being filtered. If a longer service interval is desired for the filter assembly, it is important to be able to slow the rate of deterioration.

Another source of leakage comes from vibration of the nutplate. Vibrations due to engine operation and those coming from road conditions are transmitted to the fluid filter assembly by the filter-mounting base of the engine. The distance from the outside diameter of the stem to the filter housing (i.e., shell) defines the moment arm about which the filter assembly is able to move. The greater length the moment arm, the greater amplitude of the transmitted vibrations and the greater rate of deterioration of the seals of the fluid filter assembly. This in turn increases the rate of deterioration of the filter assembly. Vibrations of the type described above also have a deterioration effect upon the seals, the nutplate, and other structure components of the fluid filter.

One solution to this problem is to increase the size of internally threaded aperture in the nutplate. However, this solution creates new problems related to formation of fluid flow apertures. With traditional nutplates, there is a significant area on the radius bend portion for fluid inlet apertures to be molded, cast, or machined directly into and through the nutplate. In contrast, the nutplate with the larger internally threaded portion has a smaller land area on the bend portion. This means that any flow hole which would be drilled, cast, or molded through that area must be extremely small. In order to generate adequate fluid flow, a large number of these holes would be required to create a sufficient flow area. This would substantially weaken the nutplate.

One solution to this flow aperture problem has been to use a specially designed inner seal. This specially designed inner seal has standoffs that maintain flow openings between the nutplate and the filter element. Instead of flowing through holes in the nutplate, the fluid flows through the openings maintained by the standoffs. With another design, the openings are maintained by standoffs that are formed on the nutplate. Forming the standoffs on the nutplate makes the shape of the nutplate more complicated, which in turn increases manufacturing costs and reduces the overall strength of the nutplate. In this design, the inner seal is also specially designed to ensure that the inner seal is properly secured within the filter.

However, these specially designed inner seals create a whole host of new problems. One problem is that these specially designed inner seals have complicated shapes, which make manufacturing of the seals expensive. Other problems are experienced during the installation and servicing of the filter. The structure of the filter does not allow for self-centering of the filter element, which can make installation of off-centered filter elements difficult. Since the specially designed inner seals are elastic, the seals are susceptible to twisting during servicing or assembly. Further, the elastic (rubber) standoffs on the inner seals can compress so as to restrict fluid flow. In order to compensate for this standoff compression, the elastic standoffs are designed with a larger uncompressed profile, and this in turn unnecessarily increases the overall size of the filter. During operation, space is limited to accommodate swelling of the specially designed inner seal, and this can lead to over compression of the inner seal against the filter head. A large amount of force then has to be applied in order to break the filter loose from the filter head. While important strides have been made in this field, there is still room for improvements in the areas of fluid control and installation/removal of fluid filter assemblies.

SUMMARY OF THE INVENTION

A fluid filter includes a filter element, a nutplate, an inner seal retainer, and an inner radial seal. The nutplate has a threaded mounting portion, and the nutplate is adapted to threadedly engage an externally threaded filter head. The inner seal retainer is positioned between the nutplate and the filter element. The inner seal retainer has at least one standoff that is adapted to provide a space for transmitting fluid between the nutplate and the filter element. The inner radial seal is coupled to the inner seal retainer in order to seal the filter element with the filter head.

DESCRIPTION OF SELECTED EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device and such further applications of the principles of the invention as described herein being contemplated as would normally occur to one skilled in the art to which the invention relates. One embodiment of the invention is shown in great detail, although it will be apparent to those skilled in the art that some of the features which are not relevant to the invention may not be shown for the sake of clarity.

Figure 1:
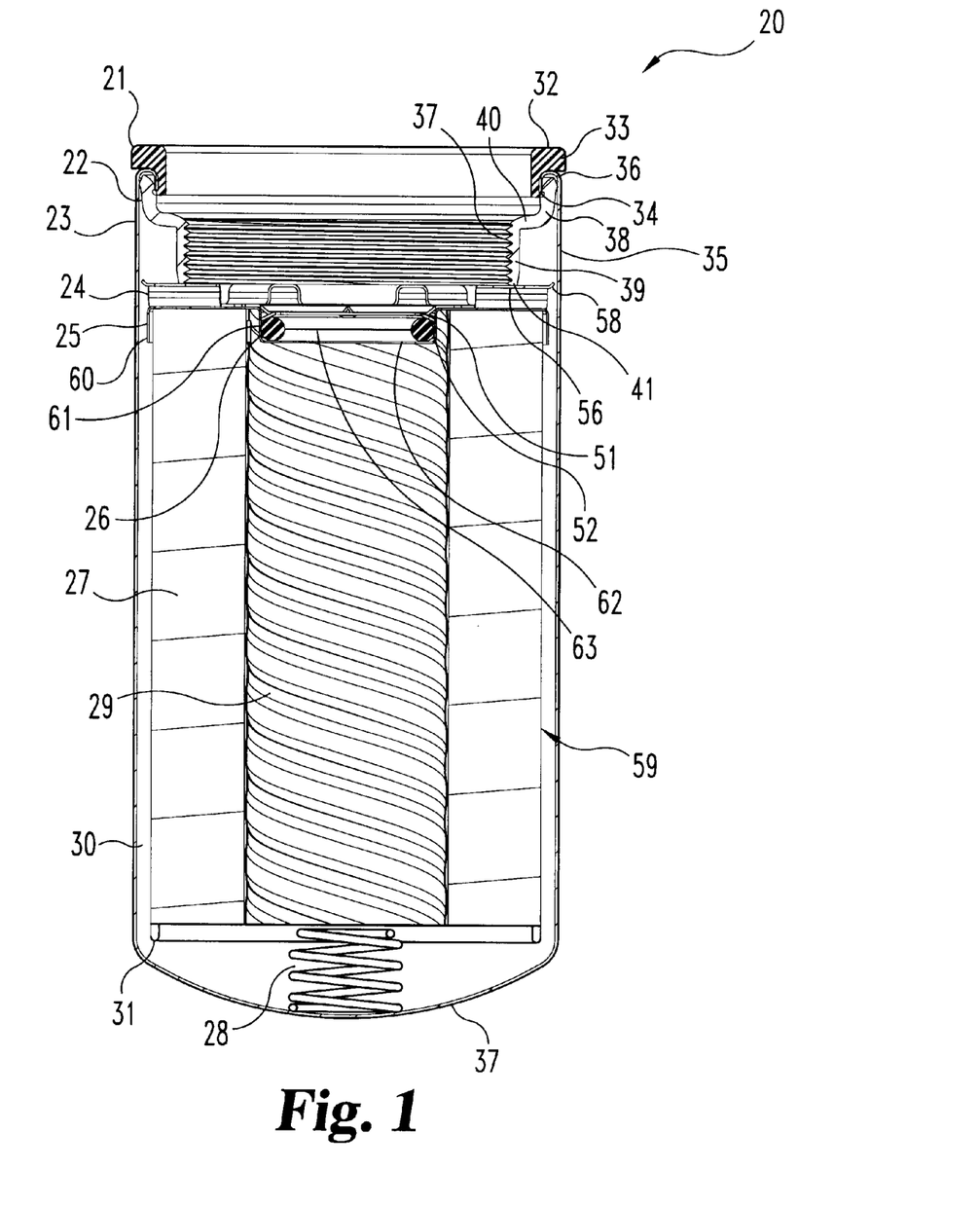
FIG. 1 is a front elevational view in full section of a fluid filter assembly according to a typical embodiment of the present invention.

Examples of previous designs of fluid filter assemblies have been shown and described in U.S. Pat. No. 5,996,810 to Bounnakhom et al., which is hereby incorporated by reference. Referring now to FIG. 1, a fluid filter assembly 20 which is constructed and arranged according to one embodiment of the present invention is illustrated. The illustrated filter assembly 20 is in an unmounted state. The filter assembly 20 includes an outer seal 21, a nutplate 22, an outer shell 23, a seal retainer 24, an inner element endplate 25, an inner seal 26, a filter element 27, and a biasing spring 28. The filter 20 further includes an inner passage 29, an outer annular passage 30, and a base endplate 31.

As illustrated, the outer seal 21 is removably coupled to the filter assembly 20. The nutplate 22 is positioned within and attached to the outer shell 23. Within the outer shell 23, the seal retainer 24 is positioned between the inner element endplate 25 and the nutplate 22. The inner seal 26 rests beneath the seal retainer 24, and the inner seal 26 is positioned between the seal retainer 24 and the inner element endplate 25. In one embodiment, the inner seal 26 floats between the inner seal retainer 24 and the inner element endplate 25. In another embodiment, the inner seal 26 is attached to the inner seal retainer 24 with glue. It should be appreciated that the inner seal 26 can be attached to the inner seal retainer 24 in other manners generally known by those skilled in the art. The inner passage 29 is defined in the filter element 27, and the outer passage 30 is formed between the outer shell 23 and the filter element 27. The endplate 25 minimizes fluid flow from one end of the filter element 27. The spring 28 presses against the base endplate 31, which in turn biases the seal retainer 24 against the nutplate 22.

The outer seal 21 is made of an elastomeric material. In one embodiment, outer seal 21 is fabricated out of rubber. As shown in FIG. 1, the outer seal 21 has a mating surface 32 that is defined on a mating lip portion 33 of the outer seal 21. The mating surface 32 is adapted to seal against a filter head of an engine. The outer seal 21 further includes a coupling lip portion 34 adapted to couple the outer seal 21 to the filter assembly 20. The outer shell 23 has a substantially cylindrical outer wall 35. A receiving channel 36 is formed at one end of the sidewall 35, and the nutplate 22 is attached to the outer shell at the receiving channel 36. The outer seal 21 provides a liquid tight seal for the fluid filter assembly 20. As illustrated, the coupling lip portion 34 of the outer seal 21 is secured by engaging a portion of the channel 36. In one embodiment, adhesive is placed in the receiving channel 36 in order to further secure the nutplate 22 to the outer shell 23. At the end opposite the receiving channel 36, the outer shell 23 has a domed end wall 37 against which the spring 28 presses.

Figure 2:
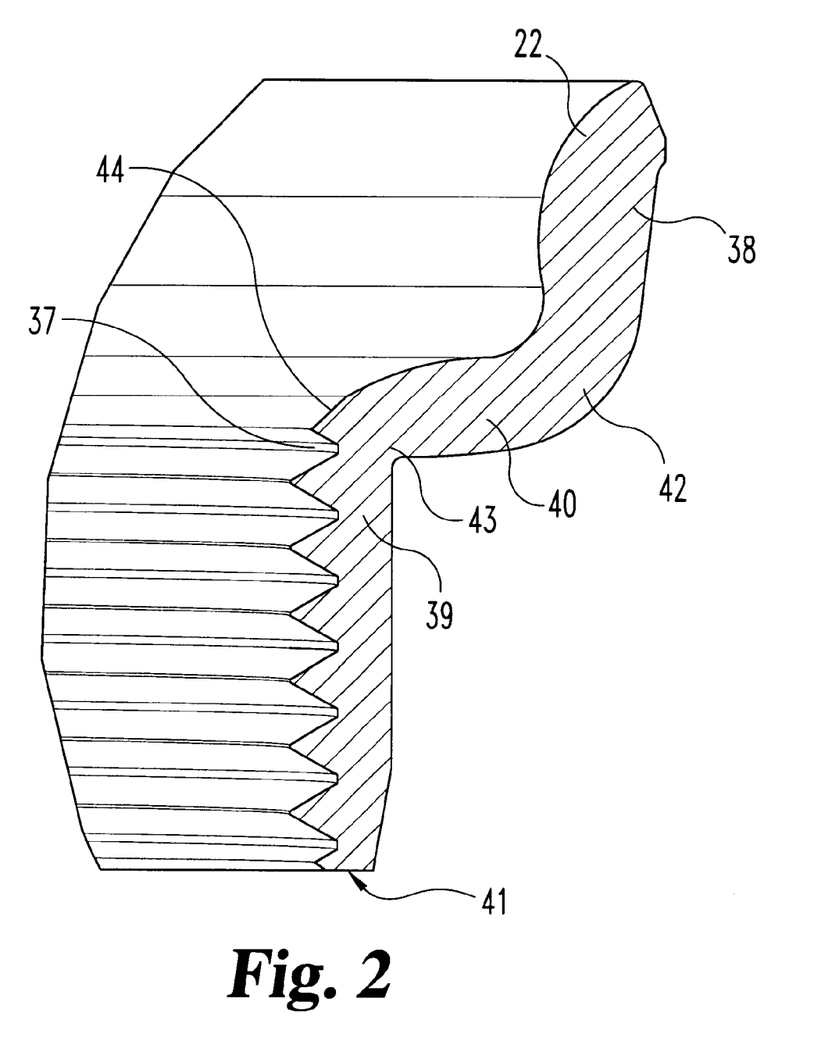
FIG. 2 is an enlarged, partial, front elevational view of the nutplate shown in FIG. 1.

As illustrated in FIGS. 1–2, the nutplate 22 has an inner threaded portion 37 adapted to threadedly engage a filter head. Further, the nutplate 22 has an outer annular portion 38 and an inner annular portion 39. A radius bend portion 40 joins the outer annular portion 38 to the inner annular portion 39. The outer annular portion 38 of the nutplate 22 is securely received within the receiving channel 36 of the outer shell 23. The nutplate 22 further has an annular end portion 41 that butts against the seal retainer 24.

In contrast to typical designs for molded or stamped nutplates, the internally threaded portion 37 is substantially larger than earlier designs such that the radial distance between the inside surface diameter of the inner annular portion 39 and the outside diameter of the outer annular portion 38 is relatively short. This significantly reduces the length of the moment arm between the two portions. In one embodiment, the inside diameter of the inner annular portion 39 is approximately 3.52 inches and the outside diameter of the outer annular portion is approximately 4.43 inches which in turn generates a moment arm of approximately 0.455 inches. With the moment arm reduced to a significantly shorter length, the amplitude of vibrations experienced by the filter 20 is reduced. Vibrations are typically generated by engine operations, and vibrations are also generated by road conditions. These vibrations are transmitted to the fluid filter 20 through the structure of the vehicle. The transmitted vibrations travel to the outer shell 23, and it is believed that the length of the moment arm is directly proportional to the amplitude of the vibrations as experienced by the outer shell 23. By increasing the inside diameter of the inner annular portion 39 over that of the more "traditional" nutplates for approximately the same outer shell size, the moment arm is reduced which in turn reduces the amplitude of vibrations that are transmitted to the outer shell 23.

As shown in greater detail in FIG. 2, the radius bend portion 40 includes an outer bend portion 42 and an inner bend portion 43 that link the outer annular portion 38 and the inner annular portion 39 together. To ensure that the filter head properly engages the nutplate 22, the threaded portion 37 has a coined lead-in thread 44. It has been found that milling of lead-in threads weakens the nutplate 22, because the milling of the lead-in threads removes material from the inner annular bend portion 43. In order to improve the strength of the nutplate 22 at the inner bend portion 43, the lead-in thread 44 is coined such that nutplate 22 is not weakened.

With "traditional" nutplates, fluid apertures are formed in the radius bend portion. Since the inside diameters of traditional nutplates are substantially smaller than the inside diameter of the nutplate 20 according to the present invention, there is a significant area on the radius bend portion for fluid inlet apertures to be molded, cast, or machined directly into and through the nutplate. However, with the nutplate 22 according to the present invention, the total width of the inside diameter to the outside diameter is very narrow, typically less than ½ inch. The only land area of inlet flow holes to be formed is in the narrow radius bend portion 40. The narrow width of the land area of the radius bend portion 40 means that any flow hole which would be drilled, cast, or molded through that area must be extremely small. In order to generate adequate fluid flow, a large number of these holes would be required to create a sufficient flow area. This would substantially weaken the nutplate 22. Accordingly, the nutplate 22 according to the present invention is free of any flow inlet holes that are formed into and through any portion of the nutplate 22. Instead, the present invention incorporates the unique style of nutplate 22 in combination with the inner seal retainer 24 in order to create a plurality of flow paths for the incoming unfiltered fluid. The unfiltered fluid passes between the nutplate 22 and the inner endplate 25 through the inner seal retainer 24.

Referring to FIG. 1, the inner seal retainer 24 at one side butts against the annular end 41 of the nutplate 22, and at the other side, the inner seal retainer 24 butts against the inner element endplate 25. With a previous filter design, the flow path of unfiltered fluid between the nutplate and endplate was maintained with a specially designed elastic inner seal that had standoffs formed thereon. Since the specially designed inner seal was made of elastic material in order ensure proper sealing, the standoffs tended to deform so as to cause flow restrictions. To solve this problem, the inner seal retainer 24 according to the present invention is made from a rigid material, such as metal, in order to reduce deformation. Further, this rigidity makes the inner seal retainer 24 to be less susceptible to twisting during servicing or assembly as compared to the previous elastic inner seal. In one embodiment, the inner seal retainer 24 is made of steel, and in another embodiment, the inner seal retainer 24 is made of plastic.

In another filter design, the flow path was maintained by solid standoffs formed on a nutplate. Formation of these standoffs on the nutplate increased the overall manufacturing costs for the nutplate and tended to reduce the overall strength of the nutplate. In addition, the solid standoffs restricted fluid flow by reducing the size of the fluid flow passage. In contrast, the inner seal retainer 24 according to the present invention is relatively inexpensive to manufacture and is structured so as to minimize fluid flow restrictions.

Figure 3:
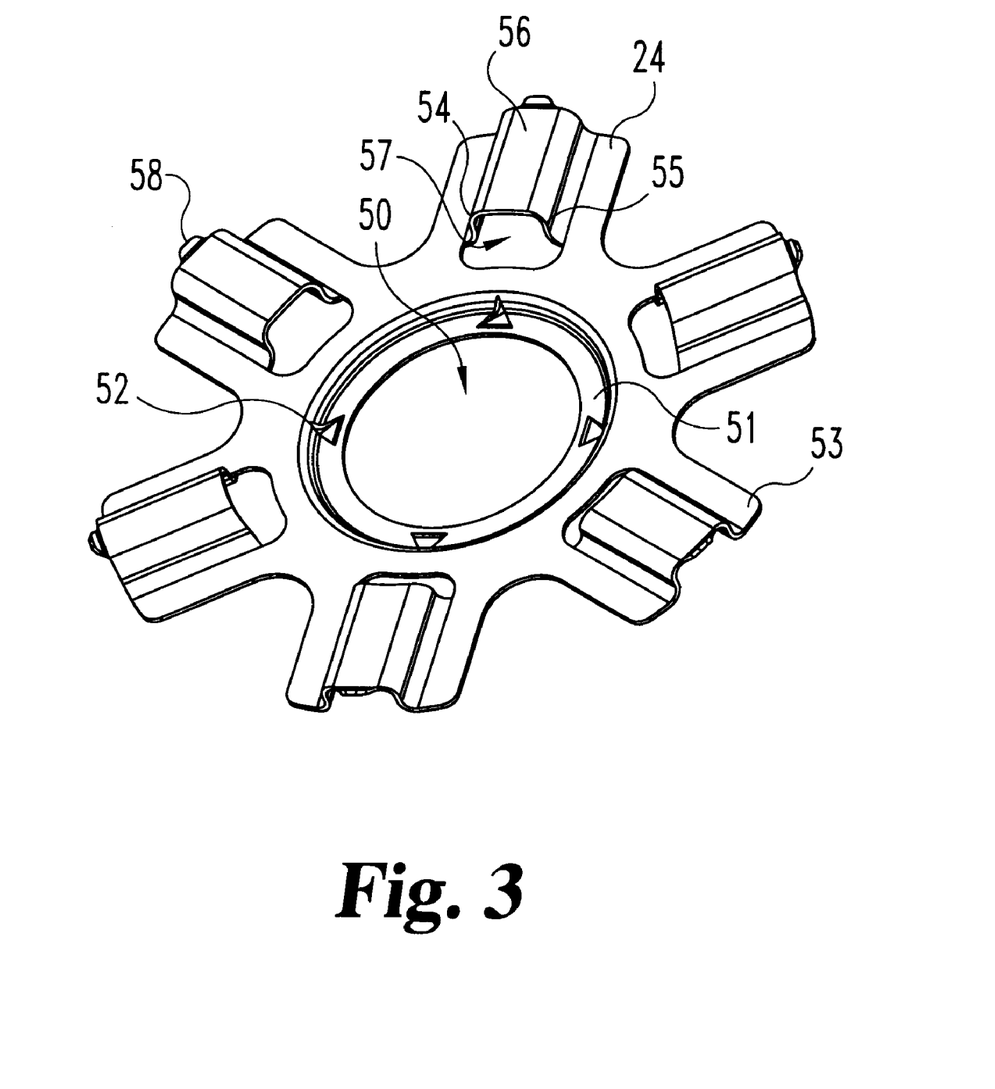
FIG. 3 is a perspective view of the inner seal retainer shown in FIG. 1.

As shown in FIG. 3, the inner seal retainer 24 has an inner opening 50 defined by an annular inner seal-retaining portion 51 that extends from the inner seal retainer 24. The inner seal-retaining portion 51 includes lance tabs 52 extending therefrom for securing the inner seal retainer 24 to inner element endplate 25. It should be understood that the inner seal retainer 24 can be secured to the inner element endplate 25 in other generally known manners, such as by gluing or spot welding. In the illustrated embodiment, the inner seal retainer 24 has six radially extending arms 53 extending from the inner seal retaining portion 51 in a radial direction with respect to the inner opening 50. It should be appreciated that the number of radially extending arms 53 can vary depending on the specific requirements for a particular application.

Each of the radially extending arms 53 has a raised hollow web (standoff) 54 defined thereon. The hollow webs 54 are adapted to space the inner element endplate 25 from the nutplate 22 so as to allow fluid to pass there through with minimal flow restrictions. Each hollow web 54 includes a pair of sidewalls 55 that are connected to a nutplate engaging wall 56. The sidewalls 55 and the nutplate engaging wall 56 define a fluid flow passage 57. In the illustrated embodiment, the sidewalls 55 are curved, and in another embodiment, the sidewalls 55 are straight. As shown in FIG. 1, the spring 28 biases the nutplate engaging walls 56 of the inner seal retainer 24 against the engaging surface 41 of the nutplate 22. The hollow webs 54 are structured so as not to deform in order to reduce flow restrictions. Fluid flowing in the filter assembly 20 can pass through the fluid flow passages 57 or around the hollow webs 54. Since the hollow webs 54 according to the present invention are rigid, the hollow webs 54 can have a lower initial profile as compared to the elastic standoffs of the specially designed inner seals. This reduced profile of the inner seal retainer 24 allows for a more compact filter design of the filter assembly 20.

Each hollow web 54 further includes an angled alignment tab 58. Alignment tabs 58 are angled so that the inner seal retainer 24 can be easily slid into the outer shell 23 during assembly. In one embodiment, each angled tab 58 is angled at approximately 40 degrees with respect to the corresponding nutplate engaging wall 56. In another embodiment, each alignment tab 58 is flat with respect to the corresponding nutplate engaging wall 56. When the filter assembly 20 is assembled, an inner filter element 59 is formed from the components between the nutplate 22 and spring 28. As shown, the inner filter element 59 floats upon the spring 28. The angled alignment tabs 58 center the inner filter element 59 within outer shell 23, and this in turn makes attaching the filter assembly 22 to the filter head easier. By abutting the outer shell 23, alignment tabs 58 prevent lateral movement of the inner seal retainer 24. This in turn will center the inner filter element 59 over the nutplate 22. The lances 52, in the illustrated embodiment, securely retain the inner seal retainer 24 during assembly and throughout the life of the filter 20.

Referring to FIG. 1, the endplate 25 includes an annular flange portion 60, a seal-enclosing portion 61, and a filter head passage 62. The annular flange portion 60 extends in the outer passage along the filter element 27. The annular seal-enclosing portion 61 has the filter head passage 62 defined therein. When assembled, the inner seal-retaining portion 51 of the inner seal retainer 24 is fitted inside the seal-enclosing portion 61 of the endplate 25. As illustrated, the inner seal 26 is provided between the seal-enclosing portion 61 of the endplate 25 and the inner seal-retaining portion 51 of the inner seal retainer 24. A seal expansion space 63 formed between the inner seal-retaining portion 51 and the seal-enclosing portion 61. When the inner seal 26 swells during use, the seal expansion space 63 provides room for expansion of the inner seal 26. This minimizes the risk of over compression of the inner seal 26.

This structure of the inner seal retainer 24 allows for the use of low cost standard O-ring seals in the filter assembly 20. In one embodiment, the inner seal 26 is a standard O-ring seal. As compared to the specially designed seals, standard O-ring seals are less susceptible to deformations and require less radial compression in order to adequately seal the filter assembly 20. This lower inner seal compression makes installation and removal of the filter assembly 20 from a filter head easier.

Figure 4:
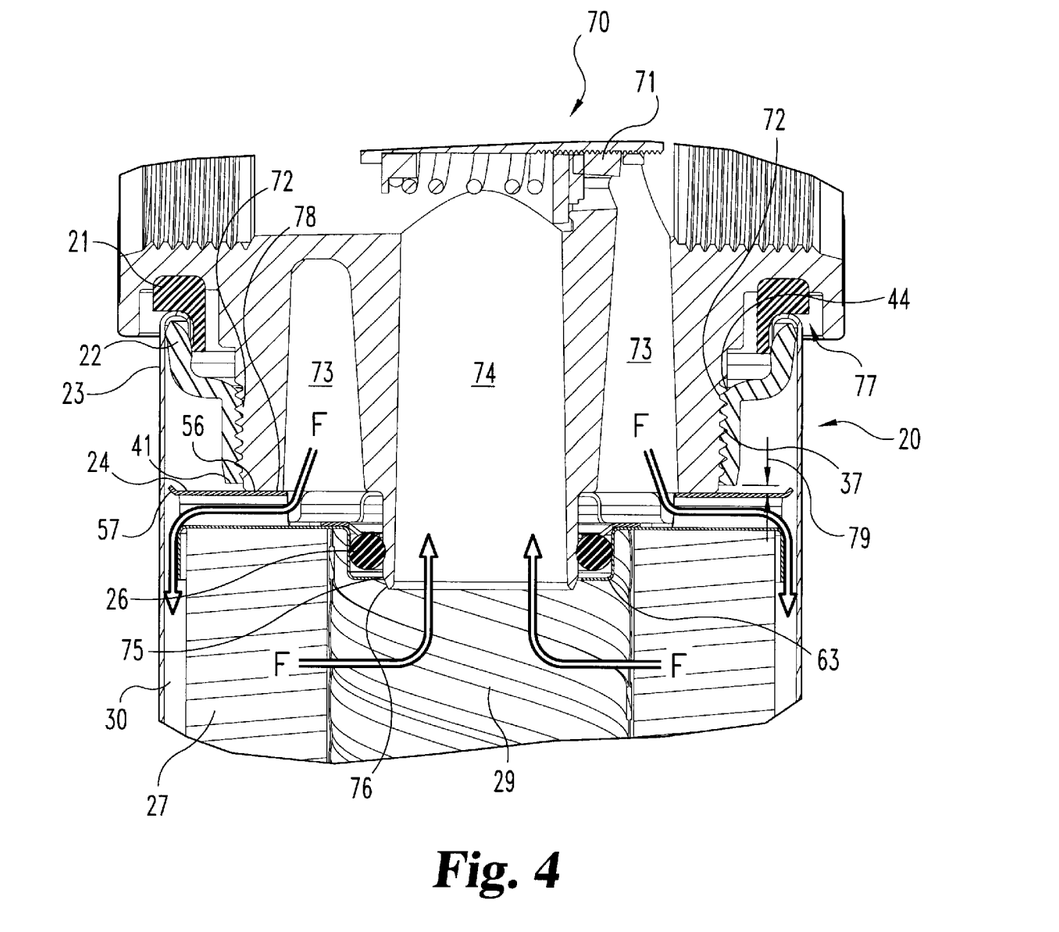
FIG. 4 is a partial, front elevational view in full section of the fluid filter of FIG. 1 as assembled onto a filter head.

A filter-filter head assembly 70 according to one embodiment of the present invention is illustrated in FIG. 4. With assembly 70, the filter assembly 20 is threadedly attached to a filter head 71. The filter head 71 has an outwardly threaded portion 72 that threadedly engages the inner threaded portion 37 of the nutplate 22. The filter head 71 further has unfiltered fluid passageways 73 defined therein that transmit unfiltered fluid from the filter head 71 to the filter assembly 20. In addition, the filter head 71 has a filtered fluid passageway 74 through which filtered fluid is received from the filter assembly 20. A portion of the filtered fluid passageway 74 is defined in an inner radial seal protrusion 75 in the filter head 71. Once assembled, the inner radial seal protrusion 75 extends through the inner opening 50 of the seal retainer 24 and the filter head passage 62 of the endplate 25. As shown, the inner seal 26 seals against the inner radial seal protrusion 75 so as to minimize fluid leakage at the connection between the filtered fluid passageway 74 and the inner passage 29. The inner radial seal protrusion 75 has a tapered end 76 that aids in inserting the protrusion through the inner seal 26. The filter head 71 further has an outer annular seal receiving channel 77. Channel 77 is adapted to receive the outer seal 21 so as to form a seal between the filter assembly 20 and the filter head 71. As illustrated in FIG. 4, the filter head 71 further includes a seal retainer engaging surface 78 that is adapted to engage the nut plate engaging surface 56 of the inner seal retainer 24.

A general description of the sequence of events during installation of the filter assembly 20 on the filter head 71 will be described below with reference to FIG. 4. Initially, the coined lead-in thread portion 44 of the nutplate 22 aligns the outwardly threaded portion 72 of the filter head 71 with the threaded portion 37 of the nutplate 22. At the same time, the inner radial seal protrusion 75 is aligned with the inner opening 50 and the filter head passage 62. As the threaded engagement continues, the inner radial seal protrusion 75 advances through the inner seal 26, and the inner seal 26 seals against protrusion 75 so that the connection between the filtered fluid passage 74 and the inner passage 29 of the filter element 27 is sealed.

As the filter assembly 20 continues to be threaded, seal retainer engaging surface 78 is oriented on the head 71 such that surface 78 engages the nutplate engaging surface 56 of the inner seal retainer 24. This separates the nutplate annular end surface 41 from the inner seal retainer 24 so as to form a gap 79. The spring 28 biases the inner seal retainer 24 against surface 78 such that the inner-filter element 59 floats on the spring 28. The spring 28 acts as a thrust bearing for the inner-filter element 59. Once surface 78 engages the inner seal retainer 24, the outer shell 23 and the nutplate 22 rotate freely about the inner filter element 59. With only the friction from the threads and the spring 28 to resist turning, the outer seal 21 contacts the seal receiving channel 77 of the filter head 71. This allows a person installing the filter 20 to experience a better feel for first contact of the outer seal 21, and this ensures more accurate outer seal compression by discouraging over tightening of the filter 20.

As shown in FIG. 4, during operation, the fluid flows through assembly 70 in the path indicated by arrows F. The unfiltered fluid flows from the unfiltered passage 73 through and between the hollow webs 56. Then the fluid flows into the outer passage 30 and through the filter element 27. Next, the filtered fluid flows into the inner passage 29 and exists through filtered fluid channel 74. When the person wishes to remove the filter 20, the person only initially needs to break the seal between the outer seal 21 and the filter head 71, which makes initial turning of the filter 20 easier. Afterwards, once the nutplate 22 contacts the inner seal retainer 24, the seal between the inner seal 26 and the filter head 71 can be easily broken loose.

While the invention has been illustrated and described in detail in the drawings and foregoing description, the same is to be considered as illustrative and not restrictive in character. It should be understood that only the preferred embodiments have been shown and described and that all changes and modifications that come within the spirit of the invention are desired to be protected.

What is claimed is:

1. An apparatus, comprising:
   an externally threaded filter head;
   a fluid filter including
      an outer shell having an open end,
      a filter element having an end plate attached thereto, said filter element being disposed in said outer shell,
      a nutplate attached to the open end of said outer shell, said nutplate having a
      threaded mounting portion adapted to threadedly engage said threaded filter head,
      an inner radial seal for sealing said filter element with said filter head,
      a rigid inner seal retainer positioned between said nutplate and the end plate of said filter element for coupling said inner seal to the end plate of said filter element, said inner seal retainer being separable from said nutplate, said inner seal retainer defining at least one rigid standoff constructed and arranged to define a passageway for transmitting fluid between said nutplate and said filter element, and
   wherein said at least one rigid standoff is formed from a rigid material whereas said inner seal is formed from a resilient material different from said rigid material; and
   wherein said filter head has a seal retainer engaging surface contacting said inner seal to space said nutplate from said inner seal retainer.

2. The apparatus of claim 1, wherein said at least one stand off includes at least one rigid hollow web extending in a radial direction.

3. The apparatus of claim 2, wherein:
   said hollow web includes a pair of sidewalls and a nutplate engaging wall connected between said pair of sidewalls; and
   said nutplate engaging wall contacts said nutplate when said filter is removed from said filter head.

4. The apparatus of claim 1, wherein said filter element has an inner passage defined therein, and said fluid filter has an outer passage defined between said outer shell and said filter element.

5. The apparatus of claim 4, wherein said filter head has an unfiltered fluid passage in fluid communication with said outer passage through said inner seal retainer, and said filter has a filtered passage in fluid communication with said inner passage.

6. The apparatus of claim 1, wherein:
   said endplate defines a seal enclosing cavity; and
   said inner seal retainer has an inner seal retaining portion fitted inside said seal enclosing cavity; and
   said seal enclosing cavity of said endplate and said inner seal retaining portion of said inner seal retainer define seal expansion space in which said inner radial seal is received.

7. The apparatus of claim 1, further comprising:
   outer seal coupled to said nutplate;
   wherein said inner radial seal includes an o-ring seal;
   wherein said inner seal retainer is formed from steel and has a plurality of hollow webs;
   wherein said inner seal retainer has at least one lance tab to secure said inner seal retainer to said endplate; and
   wherein said threaded portion of said nutplate has a coined lead-in chamfer.

8. A fluid filter, comprising:
   an outer shell having an open end;
   a filter element having an endplate attached thereto said filter element being disposed in said outer shell;
   a nutplate attached to the open end of said outer shell, said nutplate having a threaded mounting portion adapted to threadedly engage an externally threaded filter head;
   an inner radial seal for sealing said filter element to said filter head;
   a rigid inner seal retainer for coupling said inner radial seal to the end plate of said filter element, said seal retainer being positioned between said nutplate and the end plate of said filter element, said inner seal retainer and said nutplate being separate components, said inner seal retainer defining at least one rigid hollow web constructed and arranged to define a passageway for transmitting fluid between said nutplate and said filter element; and
   wherein said at least one rigid hollow web is formed from a rigid material whereas said inner seal is formed from a resilient material different from said rigid material.

9. The fluid filter of claim 8, wherein said at least one rigid hollow web includes a plurality of rigid hollow webs.

10. The fluid filter of claim 8, wherein:
said hollow web includes a pair of sidewalls and a nutplate engaging wall connected between said pair of sidewalls; and
said nutplate engaging wall contacts said nutplate when said filter is removed from said filter head.

11. The fluid filter of claim 8, wherein said rigid hollow web has an alignment tab extending therefrom and toward an inner surface of said outer shell to center said filter element.

12. The fluid filter of claim 8, wherein:
said rigid hollow web has a nutplate engaging wall at which said rigid hollow web engages said nutplate; and
said rigid hollow web includes an alignment tab extending therefrom at an oblique angle with respect to said nutplate engaging wall.

13. The fluid filter of claim 8, wherein said threaded portion of said nutplate has a coined lead-in chamfer.

14. The fluid filter of claim 8, wherein said inner seal retainer is formed from steel.

15. The fluid filter of claim 8, wherein said inner seal retainer is formed from plastic.

16. The fluid filter of claim 8, wherein said inner seal retainer has at least one lance tab to secure said inner seal retainer to said endplate.

17. The fluid filter of claim 8, further comprising:
a spring provided between said outer shell and said filter element for biasing said filter element towards said nutplate.

18. The fluid filter of claim 17, further comprising:
an endplate positioned between said inner seal retainer and said filter element;
outer seal coupled to said nutplate;
wherein said inner radial seal includes an o-ring seal;
wherein said inner seal retainer is formed from steel;
wherein said inner seal retainer has at least one lance tab to secure said inner seal retainer to said inner element endplate; and
wherein said threaded portion of said nutplate has a coined lead-in chamfer.

19. The fluid filter of claim 8, wherein said nutplate includes an outer annular portion, an inner annular portion and a bend portion joining said outer annular portion to said inner annular portion.

20. A fluid filter assembly, comprising:
an outer shell having an open end;
a filter element having an end Plate attached thereto, said filter element being disposed in said outer shell;
a nutplate attached to the open end of said outer shell, said nutplate having a threaded mounting portion adapted to threadedly engage a threaded filter head;
an inner radial seal for sealing said filter element to said filter head;
a rigid inner seal retainer for coupling said inner radial seal to the end plate of said filter element, said seal retainer being positioned between said nutplate and the end plate of said filter element, said inner seal retainer being separable from said nutplate, said inner seal retainer defining at least one rigid standoff constructed and arranged to define a passageway for transmitting fluid between said nutplate and said filter element, wherein said at least one rigid standoff has an alignment tab extending therefrom and toward an inner surface of said outer shell to align said filter element over said nutplate;
an inner radial seal coupled to said inner seal retainer for sealing said filter element with said filter head;
said rigid standoff has a nutplate engaging wall at which said rigid standoff engages said nutplate; and
said alignment tab extends from said rigid standoff at an oblique angle with respect to said nutplate engaging wall and toward said nutplate to align said filter element over said nutplate.

21. The fluid filter of claim 20, wherein said at least one standoff includes at least one rigid hollow web.

22. The fluid filter of claim 20, wherein said angle is approximately 40 degrees.

23. An apparatus, comprising:
an externally threaded filter head; and
a fluid-filter including
an outer shell having an open end;
a filter element disposed in said outer shell,
a nutplate attached to the open end of said outer shell, said nutplate having a threaded mounting portion adapted to threadedly engage said threaded filter head,
an endplate attached to an end of said filter element proximal said nutplate,
an rigid inner seal retainer positioned between said nutplate and said filter element, said inner seal retainer defining at least one rigid hollow web constructed and arranged to define a passageway for transmitting fluid between said nutplate and said filter element, said inner seal retainer being separable from said nutplate, and
an inner radial seal positioned in an expansion space defined between said endplate and said inner seal retainer for sealing said filter element with said filter head, wherein said at least one rigid hollow web is formed from a rigid material whereas said inner seal is formed from a resilient material different from said rigid material.

* * * * *